United States Patent
Unno

[19]

[11] Patent Number: 6,160,614
[45] Date of Patent: Dec. 12, 2000

[54] METHOD, APPARATUS AND COMPUTER PROGRAM PRODUCT FOR CLASSIFICATION OF MEASURED DATA FROM MULTI-CORE OPTICAL FIBER

[75] Inventor: Yasushi Unno, Tokyo, Japan

[73] Assignee: Ando Electric Co., Ltd., Tokyo, Japan

[21] Appl. No.: 09/314,471

[22] Filed: May 18, 1999

[30] Foreign Application Priority Data

May 19, 1998 [JP] Japan .................................. 10-137228

[51] Int. Cl.⁷ .................................................. G01N 21/00
[52] U.S. Cl. ........................................................... 356/73.1
[58] Field of Search .............................. 356/73.1; 385/37, 385/129, 33, 27; 359/563, 566, 569, 341, 184, 187, 239, 264

[56] References Cited

U.S. PATENT DOCUMENTS 5,596,449  1/1997  Furuhashi et al. .
5,671,308  9/1997  Inoue et al. .

*Primary Examiner*—Frank G. Font
*Assistant Examiner*—Tu T. Nguyen
*Attorney, Agent, or Firm*—Dabry & Dabry

[57] ABSTRACT

There is provided a method, an apparatus and computer program product for the classification of measured data from a multi-core optical fiber, wherein even with event points which are difficult to distinguish or with identical event points and when there are deviations in distances between event points, connection losses and the like for all event points can be classified. Measured waveform data measured using an OTDR apparatus is read in. Then level differences with connection losses which coincide or exceed a predetermined threshold value are identified as event points, and the event information related to the event points is obtained. Next the event information related to the head core optical fiber is registered in a master file. Then an interval distance between adjacent event points registered in the master file is obtained. After this, event points which exist within a predetermined allowable range of the event points registered in the master file are searched out from each event point in the object core optical fiber, and determined to be identical event points. Then if the event distance of the object core optical fiber is less than the event distance registered in the master file, the event information registered in the master file is updated using the event information for the object core optical fiber. After this, of the event points included in the object core optical fiber, all the event information related to event points which are not identical event points is registered in the master file. Then the processing described above are executed for all core optical fibers. Finally connection losses and the like are classified for each event point.

19 Claims, 8 Drawing Sheets

FIG.6

INTERVAL NAME ARAI~WASHIZU
CABLE TYPE SM
CABLE LENGTH 16.442km
NUMBER OF CONNECTION POINTS (n) 6
NUMBER OF CONNECTION POINTS (c) 0

DATE OF MEASUREMENT '97.1.30
OPERATOR ANDO
MEASUREMENT WAVELENGTH 1310nm
MEASUREMENT APPARATUS AQ-7140C
MEASUREMENT TERMINAL (TOP) ARAI
MEASUREMENT TERMINAL (BOTTOM) WASHIZU

| CORE OPTICAL FIBER NO. ETC | CONNECTION POINT 1 | CONNECTION POINT 2 | CONNECTION POINT 3 | CONNECTION POINT 4 | CONNECTION POINT 5 | CONNECTION POINT 6 | END |
|---|---|---|---|---|---|---|---|
| CONNECTION CLASSIFICATION | FUSION | FUSION | FUSION | FUSION | FUSION | FUSION | |
| DISTANCE | 0.719 | 1.984 | 2.157 | 2.795 | 1.364 | 6.946 | 0.469 |
| 1 | 0.09 | 0.07 | 0.10 | 0.19 | -0.15 | 0.17 | |
| 2 | 0.04 | -0.11 | 0.25 | -0.21 | -0.12 | 0.07 | |
| 3 | -0.06 | -0.09 | 0.00 | 0.06 | 0.06 | -0.04 | |
| 4 | 0.05 | 0.02 | -0.21 | 0.20 | 0.16 | -0.22 | |
| 5 | -0.10 | -0.14 | -0.12 | -0.05 | 0.03 | -0.10 | |
| 6 | 0.06 | -0.05 | 0.01 | -0.16 | 0.10 | -0.11 | |
| 7 | 0.01 | -0.01 | -0.02 | 0.12 | -0.10 | 0.17 | |
| 8 | 0.09 | -0.05 | -0.04 | 0.12 | -0.07 | -0.10 | |

| | AVERAGE VALUE | STANDARD VALUE | MAXIMUM VALUE | MINIMUM VALUE |
|---|---|---|---|---|
| FUSION POINT CONNECTION LOSS [dB] | 0.00 | 1.60 | 0.25 | -0.22 |
| CONNECTOR CONNECTION LOSS [dB] | 0.00 | 2.30 | 0.00 | 0.00 |

METHOD, APPARATUS AND COMPUTER PROGRAM PRODUCT FOR CLASSIFICATION OF MEASURED DATA FROM MULTI-CORE OPTICAL FIBER

BACKGROUND OF THE INVENTION

1. Field of the Invention

The present invention relates to a method, an apparatus and a computer program product for the classification of measured data from a multi-core optical fiber in which the multi-core optical fiber comprising a plurality of core optical fibers each of which has a plurality of connection points is subject to an optical pulse test, and the measured waveform data obtained from the test is then analyzed to determine the amount of loss at the connection points and the amount of reflection at the reflection points for each core optical fiber in the optical fiber path, and these amounts are classified for each core optical fiber and a classification table then produced. More specifically it relates to a technique for generating a file called a master file which is used by a measured data classification apparatus for classification processing. The present invention is based on Japanese Patent Application No. Hei-10-137227, the content of which is incorporated as a portion of this application.

2. Description of the Related Art

The provision of optical fiber networks is essential in realizing a multimedia networked society. Consequently, provision of this type of optical fiber network has centered on main trunk systems. In recent years however, there has been a rapid expansion of optical fiber networks to include subscriber systems. Optical fiber measuring devices such as OTDR (Optical Time Domain Reflectometer) apparatus are used to sustain the expansion of these optical fiber networks. OTDR apparatus are also known as optical fiber analyzers and optical pulse testing devices. By using an OTDR apparatus, the loss distribution in a longitudinal direction along an optical fiber can be viewed directly from one end of the optical fiber, and so these apparatus have been widely used in optical fiber applications.

Furthermore, the provision of optical fiber networks has required large amounts of cable to be laid, as well as the classifying of various data obtained from measurements of the optical fiber paths which is used for managing maintenance of the networks. To explain in more detail, there are typically between 1000 and 2000 core optical fibers laid between two stations. In order to conduct tests or carry out maintenance on an optical fiber path such as this, which comprises a plurality of core optical fibers each of which has a plurality of connection points, an OTDR apparatus conducts an optical pulse test on each of the core optical fibers, and based on the measurement results obtained from the tests, creates a classification table for every core optical fiber, of information such as the connection loss and amount of reflection (hereafter referred to as the characteristic data of the optical fiber) at the fusion points and connector connection points (hereafter referred to as events, or event points) of the optical fiber. Based on this classification table, judgements are made as to whether the loss value at a fusion point exceeds the standard value, or whether there is a break in the line.

Heretofore, the classification operation has been conducted in the manner described below. First, the operator randomly selects, for example, three core optical fibers from the plurality of core optical fibers, and then using an OTDR apparatus conducts an optical pulse test on each of the core optical fibers chosen, with the waveform data thus obtained being used to generate a loss distribution measured waveform, which can then be displayed on a screen, for example. The operator then inspects the measured waveform displayed for event points, and marks the location of any event points present in the measured waveform.

FIG. 7 shows an enlargement of one portion of a loss distribution measured waveform measured by an OTDR apparatus. In the figure, the horizontal axis represents the distance, referenced against the OTDR apparatus, from the OTDR apparatus to a position in the optical fiber path, and the vertical axis represents the optical level of return light such as backward scattered light and Fresnel reflected light occurring in the optical fiber path.

As shown in the figure, each of the core optical fibers C1~C3 displays an event point indicated by a level difference which represents a connection loss resulting from fusion of the optical fiber. In this case, the operator would set markers M1 and M2 in the measured data classification apparatus to include all of these event points occurring within the core optical fibers C1~C3. Furthermore, in the figure, because the event points represent fusion points, the operator must also make settings in the measured data classification apparatus which convey this information. Hereafter the information which conveys whether each event point is a fusion point or a reflection point is termed the "connection classification". For every event point not shown in FIG. 7 then, the operator must set a marker on either side of the event point as well as a connection classification. These markers and connection classifications are not set for each individual core optical fiber, but rather are set as data common to all core optical fibers.

The measured data classification apparatus stores the data set by the operator in a file inside the measured data classification apparatus known as a "master file". The data collected when an OTDR apparatus is used to perform an optical pulse test on an optical fiber path, includes not only the marker locations (explained below in further detail) and connection classifications set using the OTDR apparatus for each event point, but also various data relating to factors other than the event points such as the distance range corresponding to the length of the optical fiber path to be measured, and the pulse width of the optical pulse to be input into the optical fiber path in accordance with the distance range. The aforementioned master file is of the same format as this data collected by the OTDR apparatus.

Once the operator has set markers for all the event points, the measured data classification apparatus investigates, based on the master file, the measured waveform data for each core optical fiber between the markers M1 and M2 set for each event point and determines whether or not an event occurs, and then computes for all of the approximately 1000~2000 core optical fibers the amount of loss at the fusion points and the amount of reflection at the reflection points. The measured data classification apparatus then generates a classification table, based on the computed results obtained, of the connection loss value and the amount of reflection for each core optical fiber at each event point, and displays this classification table on screen.

As described above, in conventional measured data classification apparatus, markers and connection classifications for each event point based on the measured waveforms are set only for the several core optical fibers randomly selected by the operator from a great number of core optical fibers. The markers and connection classifications set in this manner are then considered to be common to all of the core optical fibers, and the connection loss value and the amount of reflection are then investigated for each event point. That is, because the setting of the marker locations is performed manually by the operator, it is impractical for the operator to set markers for all of the 1000~2000 core optical fibers. Consequently, the measured data classification apparatus sets the marker locations based solely on the measured waveforms obtained from the limited number of core optical fibers selected by the operator.

Even with the use of this type of marker location setting procedure, provided there is very little variation between core optical fibers in terms of the distance at which an event point occurs, no particular problems arise. However, in a multi-core optical fiber it is extremely rare for the locations (distances) at which events occur to be identical across different core optical fibers, and a certain amount of variation is usual. Consequently, as shown in FIG. 8, if the operator has used core optical fibers C1~C3 to set the markers M1 and M2 to indicate the range in which an event occurs, and a core optical fiber Cn then exists in which the same event occurs outside of this marked range, then the connection loss value and the amount of reflection relating to this event point cannot be classified for this particular core optical fiber Cn.

In order to prevent this type of problem, it should be possible to take into consideration the variation in event point location across the core optical fibers and include, for a single event point, the core optical fiber with the shortest distance and that with the longest distance, by moving the set location of the marker M1 further left, for example. However, because an optical fiber has as many as 1000~2000 core optical fibers, in reality the burden on the operator becomes enormous. In fact, it is virtually impossible for the operator to conduct this type of adjustment of the marker locations for every core optical fiber.

In addition to the above problems, in those cases where due to factors such as the precision of the fusion the connection loss is not particularly large and generates only a small level difference, the operator is sometimes unable to recognize an event point by just viewing the measured waveform. That is, as shown in FIG. 9, despite the fact that a fusion event point exists between the markers M1 and M2 in all of the core optical fibers C1~C3 selected by the operator, because the connection loss is almost negligible it becomes very difficult to determine whether or not an event point exists based only on the measured waveform displayed on the screen. If as a result, no markers are set for an event point, then even if there is a significant connection loss in core optical fibers other than the selected core optical fibers C1~C3, the connection loss will not be classified for this event for any of the core optical fibers. Of course, it can be said that rather than limiting the number of core optical fibers selected to three fibers, the operator could set marker locations for a larger number of core optical fibers. However, the maximum number of core optical fibers which need to be investigated to alleviate the problems is of course ill-defined. Furthermore, increasing the number of core optical fibers to be examined to several dozen increases the work burden on the operator enormously, and cannot be considered a practical solution.

SUMMARY OF THE INVENTION

Consequently, it is an object of the present invention to provide a method, an apparatus and computer program product for the classification of measured data from a multicore optical fiber, wherein even in those cases in which core optical fibers exist for which an operator would find it difficult to recognize the existence of an event point, and even in those cases where the location of an event point varies across different core optical fibers, accurate marker locations can be set for each event point, for every core optical fiber which makes up the multi-core optical fiber comprising a plurality of connection points, thus enabling the accurate classification of loss values and amounts of reflection.

In the present invention all of the event points are detected from the measured waveform data for each core optical fiber of the multi-core optical fiber obtained by optical pulse tests, and event information is then generated for each of these event points. Next, all the groups of identical event points from amongst all event points are searched for, and the event information for one of the event points of the identical event points for each group is determined as the master event information. Then, based on this master event information and the measured waveform data, the optical characteristic data relating to each event point which corresponds to the master event information is computed for each core optical fiber.

Furthermore, with the present invention, all the event points are detected from the waveform data of each core optical fiber of the multi-core optical fiber obtained by optical pulse tests, and event information is then generated for each of the event points. Next, a head core optical fiber is selected and the event information thereof stored in the master file, and then a core optical fiber other than the head core optical fiber is selected as the object core optical fiber. Next, event points which occur within an allowable range, based on the event point distance corresponding to each event information stored in the master file, are judged to be mutually identical event points, and the event information relating to these event points are then searched out from the event information of the object core optical fiber, and each piece of event information determined as master event information, and the event information within the master file then replaced with this master event information. Furthermore, any event information relating to the object core optical fiber which is not stored in the master file is also registered in the master file. The object core optical fiber is then changed and the above processing repeated for all of the core optical fibers. Then based on the event information stored in the master file and the measured waveform data, the optical fiber characteristic data are computed for each core optical fiber at each event point corresponding to the stored event information in the master file.

Using the above method, even in those cases where core optical fibers exist for which the measured waveform data make it difficult to determine event points, the optical fiber characteristic data such as the connection loss and amount of reflection can be classified for all the core optical fibers and for all event points, without exception.

BRIEF DESCRIPTION OF THE DRAWINGS

FIG. 6 is a diagram showing an example of a classification table output by the measured data classification apparatus 5 shown in FIG. 1.

DESCRIPTION OF THE PREFERRED EMBODIMENT

Figure 1:
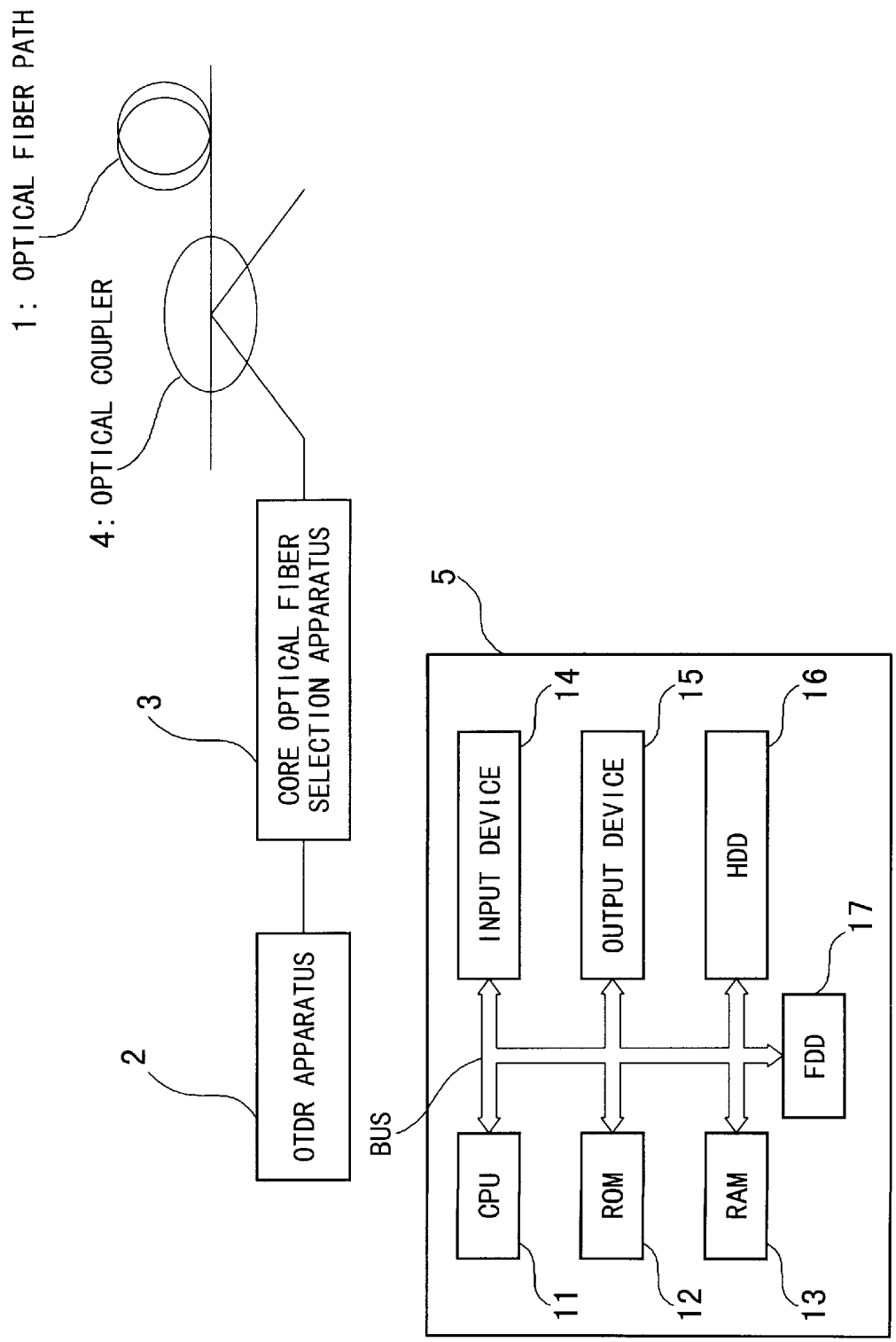
FIG. 1 is a block diagram showing the construction of a measured data classification apparatus 5 and an apparatus for conducting optical pulse tests according to an embodiment of the present invention.

FIG. 1 is a block diagram according to an embodiment of the present invention showing the construction of a measured data classification apparatus for a multi-core optical fiber and an apparatus for conducting optical pulse tests. In the figure, an optical fiber path 1 to be measured comprises a multi-core optical fiber with a plurality of connection points. An OTDR apparatus 2 carries out optical pulse tests on the optical fiber path 1 by inputting an optical pulse into the optical fiber path 1 and then receiving the return light returning from the optical fiber path 1, as described above. A core optical fiber selection apparatus 3 selects only an object core optical fiber from the plurality of core optical fibers which make up the multi-core optical fiber, and connects the selected core optical fiber to the OTDR apparatus 2. An optical coupler 4 is a branched module for connecting the optical fiber path 1 to the OTDR apparatus 2 via the core optical fiber selection apparatus 3. The apparatus indicated by numeral 5 is a measured data classification apparatus according to the embodiment of the invention.

Next is a detailed explanation of each component of the measured data classification apparatus 5. The measured data classification apparatus 5 is a computer which functions according to program control, and any typical personal computer or work station can be used. As shown in the figure, the measured data classification apparatus 5 comprises a CPU (central processing unit) 11, a ROM (read only memory) 12, a RAM (random access memory) 13, an input device 14, an output device 15, a HDD (hard disk drive device) 16, and an FDD (floppy disk drive device) which are connected via a BUS.

The CPU 11 is a processor which controls the various components located inside the measured data classification apparatus 5. Details regarding the functions of the CPU 11 will become clear as the operation thereof is explained. The ROM 12 contains pre-stored start-up programs which the CPU 11 executes in order to initiate the operating system which enables control of the computer. The RAM 13 is used as the working area when the CPU 11 carries out processing. For example the aforementioned master file is stored in the RAM 13. The input device 14 detects commands performed on the measured data classification apparatus 5 by an operator, and transmits the contents of the commands to the CPU 11. The input device 14 is comprised of, for example, a keyboard and a mouse. The output device 15 displays or prints out the measured waveforms measured by the OTDR apparatus 2, as well as items such as the classification tables which record the connection loss value and amount of reflection at each event point for each core optical fiber. The output device 15 is comprised of, for example, a screen or a printer. The HDD 16 stores all the measured waveform data relating to all the core optical fibers measured by the OTDR apparatus 2.

A floppy disk on which has been recorded a classification processing program for carrying out classification processing on the measured data obtained from the optical fiber path 1 is mounted in the FDD 17. The classification processing program is installed on to the HDD 16 from the floppy disk as a program file, and is then read into RAM 13 and executed by the CPU 11 during classification processing. The classification processing program controls the operation of the various components located inside the measured data classification apparatus 5 in accordance with the procedure detailed below. The use of devices such as CD (compact disk) drive devices or magneto-optical disk drive devices instead of the floppy disk drive device is also possible. In such a case, the classification processing program is stored on the recording medium of the floppy disk, CD-ROM or magneto-optical disk. Furthermore, the classification processing program can also be prerecorded in the ROM 12.

To conduct the classification processing, a floppy disk on which is stored the measured waveform data collected by the OTDR apparatus 2 is mounted in the FDD 17, and the measured waveform data then read from the floppy disk onto the HDD 16. Of course in this step also, alternative storage media such as a memory card or a magneto-optical disk can be used instead of the floppy disk.

The classification processing program can be recorded onto any recording medium which can be read by the computer. Then, by reading the recorded classification processing program from the recording medium into the computer and executing the program, the measured data for the multi-core optical fiber can be classified. What is referred to here as a computer also includes operating systems and hardware such as peripheral devices. In the case where the WWW (World Wide Web) system is used, environments which provide home pages are also included. Furthermore, in terms of recording media which can be read by the computer, in addition to those media listed above, also included are networks such as the internet, and transmission media and transmission waves, where the program is retained dynamically for only a short period of time, as in the case of a transmission line where the program is transmitted via a communication line such as a phone line. In such a case, media which retain a program for only a specified time, such as volatile memory located inside a computer which acts as a client or a server are also included. Furthermore, programs which only perform a portion of the functions detailed below are also possible. Moreover, files and programs which combine with programs already stored in the computer (differential files or differential programs) to produce the required functions are also possible.

Figure 2:
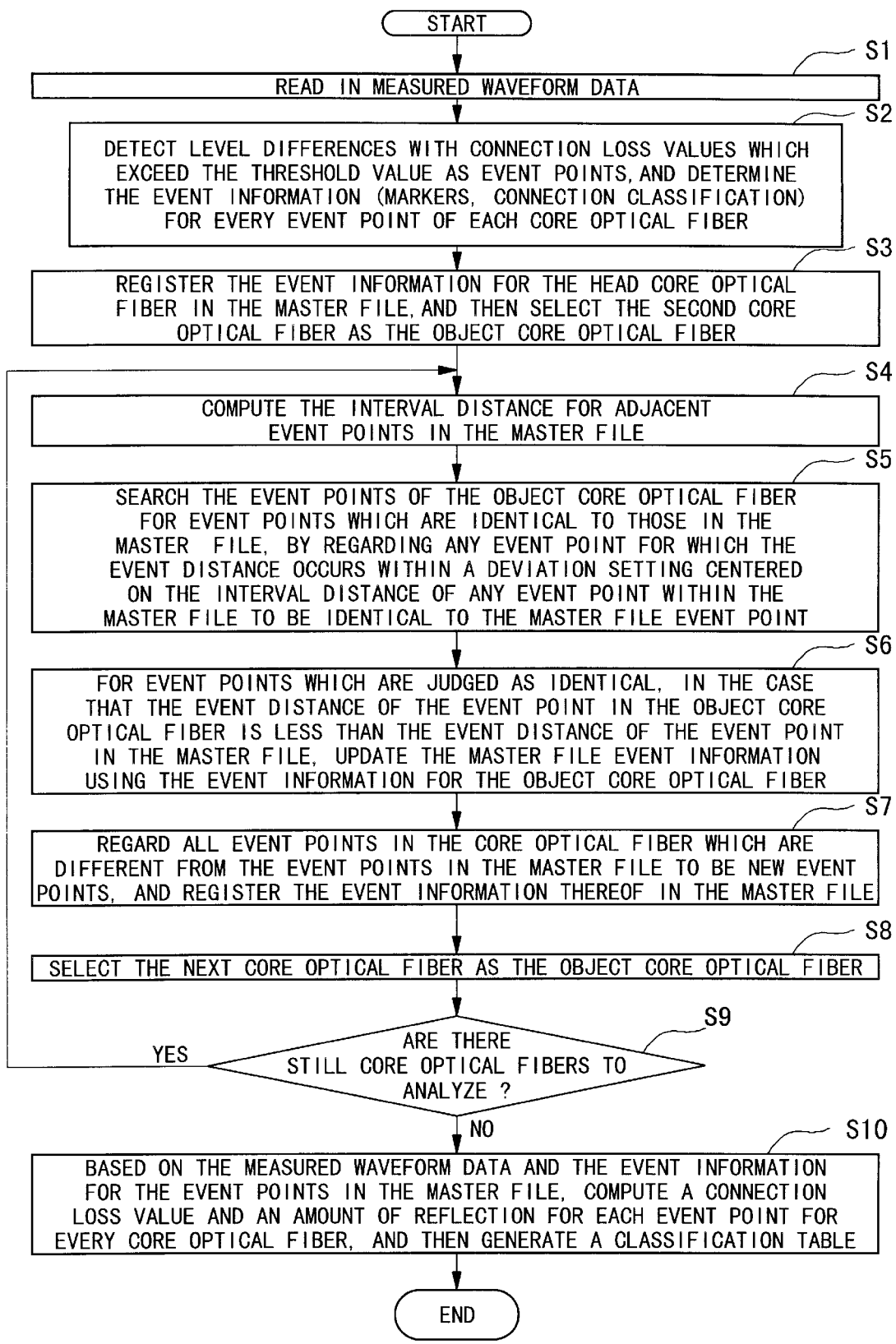
FIG. 2 is a flow chart showing the sequence of the classification processing carried out by the measured data classification apparatus 5 shown in FIG. 1.

Next, with reference to the flowchart of FIG. 2, is an explanation of the details of the measured data classification processing performed by a measured data classification apparatus 5 of the structure described above.

First, prior to creation of the master file, the OTDR apparatus 2 is used to perform optical pulse tests on each core optical fiber of the optical fiber path 1. That is, the OTDR apparatus 2 sends a command to the core optical fiber selection apparatus 3, and following the selection of a single core optical fiber from within the optical fiber path 1 as the object core optical fiber to be measured, an optical pulse is input into the optical fiber path 1 via the optical coupler 4, and the return light generated inside the optical fiber path 1 such as backward scattered light and Fresnel reflected light is received and the optical level of the received light recorded. Then, with the OTDR apparatus 2 controlling the core optical fiber selection apparatus 3, the optical pulse test is conducted on all of the core optical fibers, and the measured waveform data obtained therefrom stored internally.

Figure 3:
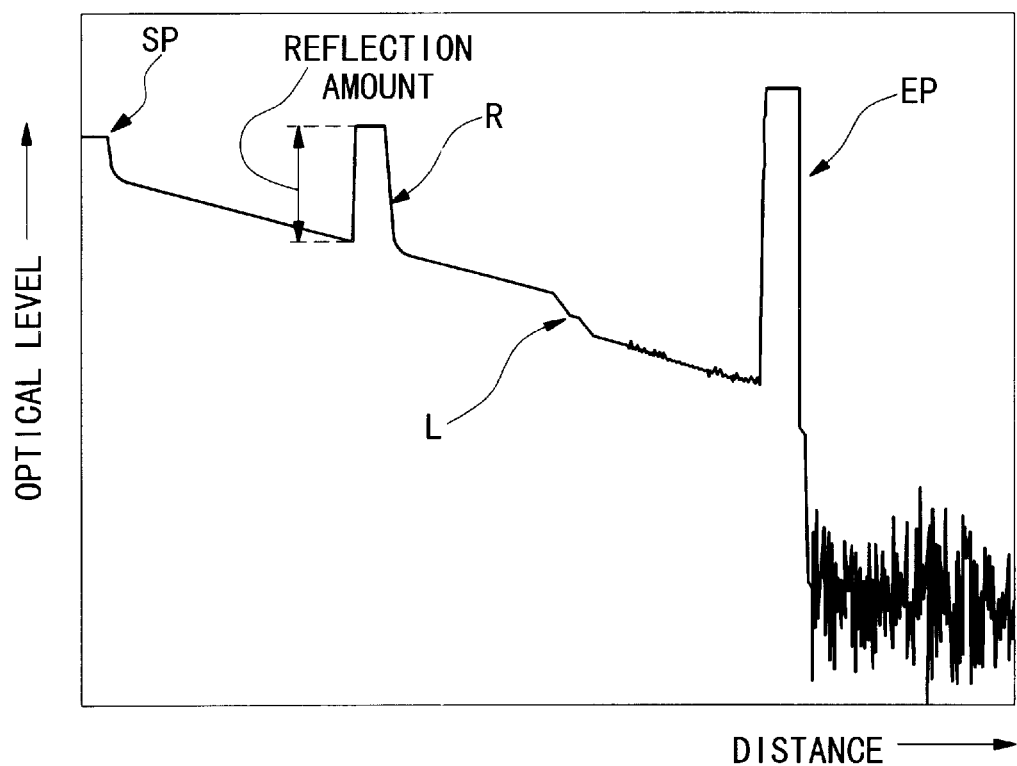
FIG. 3 is an explanatory diagram showing an example of a waveform measured by an OTDR apparatus.

Because the actual optical pulse tests conducted by the OTDR apparatus 2 are commonly used tests, explanation of the details thereof is omitted. The explanation here is limited to a simple explanation of the measured waveforms obtained from the optical pulse tests. FIG. 3 shows an example of a measured waveform reproduced from measured waveform data collected by the OTDR apparatus 2. In the figure, the horizontal axis represents the distance corresponding to the time elapsed from the point of the inputting of the optical pulse into the optical fiber path 1, with points further left along the axis closer to the OTDR apparatus 2 (towards the near end) and points further right along the axis further away from the OTDR apparatus 2 (towards the far end). The vertical axis represents the optical intensity of the return light emitted from the optical coupler 4 expressed as a logarithm. As is shown in the figure, typically the level of the received light of the measured waveform is a falling straight line. The pulse shaped waveform R corresponds to a connector within the optical fiber, and the level difference L corresponds to a connection loss resulting from a portion where two optical fibers have been connected by fusion. Furthermore, the pulse shaped waveform EP is known as the end point, and is generated by Fresnel reflection from the far end of the optical fiber path 1. Similarly, the waveform at the near end labeled with label SP is known as the start point.

As described above, the OTDR apparatus 2 is used to conduct optical pulse test measurements in advance, and the measured waveform data obtained from the measurements are then recorded onto a floppy disk, which is then mounted in the FDD 17 of the measured data classification apparatus 5. When an operator then initiates the classification processing from the input device 14, the CPU 11 sequentially reads from the floppy disk mounted in the FDD 17 the measured waveform data relating to all the core optical fibers, and transfers all the measured waveform data to the HDD 16 (step S1).

Once all the measured waveform data for all the core optical fibers has been stored on the HDD 16, then based on this measured waveform data stored on the HDD 16, the CPU 11 detects all the event points present in each core optical fiber, and then for each event point determines the distance from the start point, the markers, and the connection classification (hereafter referred to as "event information") using the method outlined below. In the measured data classification apparatus 5 according to the present embodiment, each event point is assigned a group of four markers, in the same manner as the OTDR apparatus 2.

Figure 4:
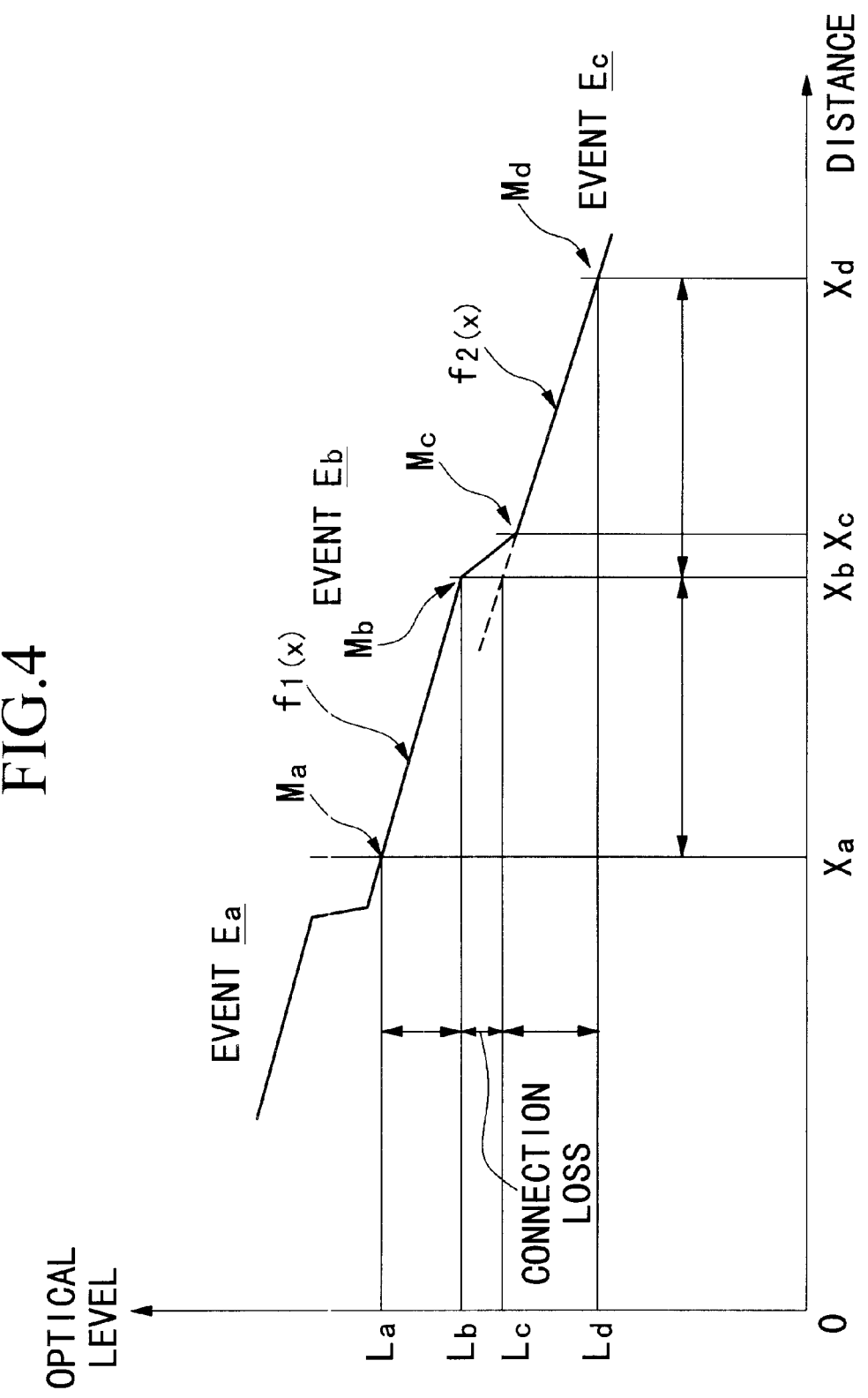
FIG. 4 is an explanatory diagram showing marker locations for an event point set by the measured data classification apparatus 5 shown in FIG. 1, as well as the relationship between event points.

For example, if event points generated by fusion points are labeled Ea~Ec as in FIG. 4, then for event Eb four markers Ma~Md are assigned at distance locations xa~xd. Of the four markers, the marker Mb is assigned to the vertex portion of the level difference, and the distance xb of the marker Mb is treated as the distance location of the event Eb. Hereafter, for an event point, the distance location of the marker which is equivalent to the marker Mb may be termed "the event distance". The marker Mc is, with the distance xb as a reference, at a location away therefrom (towards the far end side) by a pulse width of an optical pulse input into the optical fiber path 1. The marker Md is typically set at the vertex portion of the level difference corresponding to the next event Ec (that is, at the location of a marker Mb of the event Ec). There are occasions when the marker Md is set at a location further left (towards the near end) than that described above, but as this does not relate directly to the present invention, the explanation is omitted. The marker Ma is set at the same location as a marker Mc assigned to the event Ea which occurs immediately prior to the event Eb.

Figure 5:
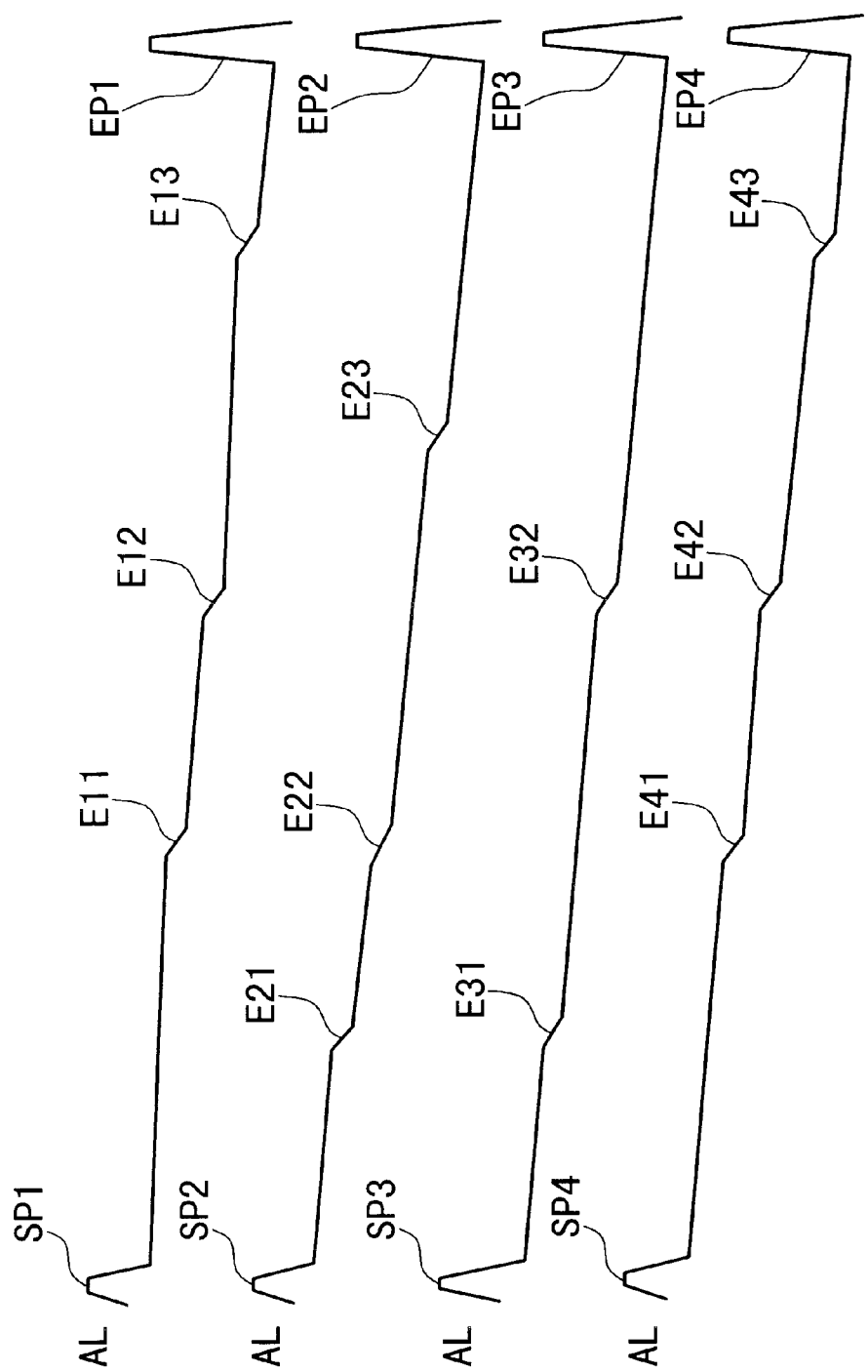
FIG. 5 is an explanatory diagram showing an example of loss distribution waveforms measured for four core optical fibers C1~C4 beginning with a head fiber.
Figure 7:
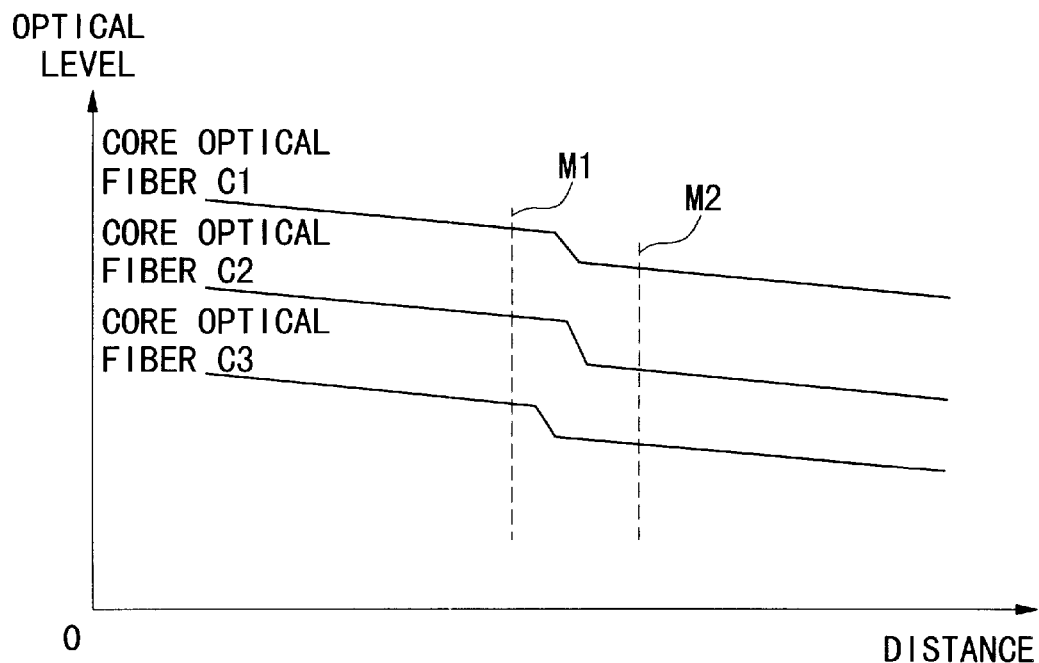
FIG. 7 is an explanatory diagram showing an example of marker locations set for measured waveforms by an operator according to conventional methods.
Figure 8:
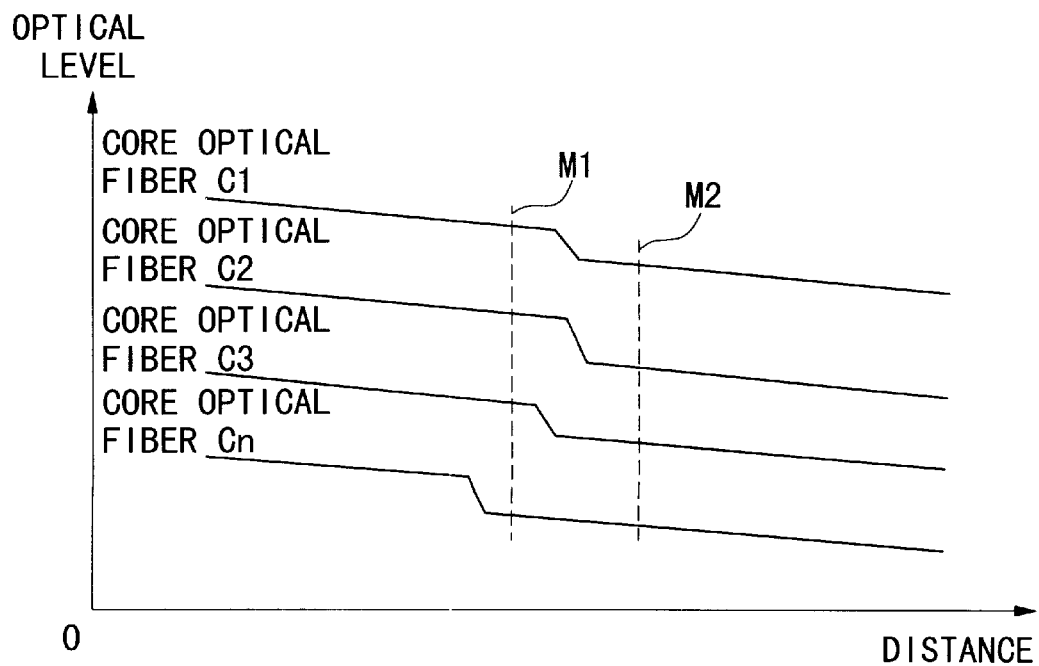
FIG. 8 is an explanatory diagram showing an example of a measured waveform in which a core optical fiber Cn exists which incorporates an event which does not fall within the range of the two markers M1~M2 set by an operator.
Figure 9:
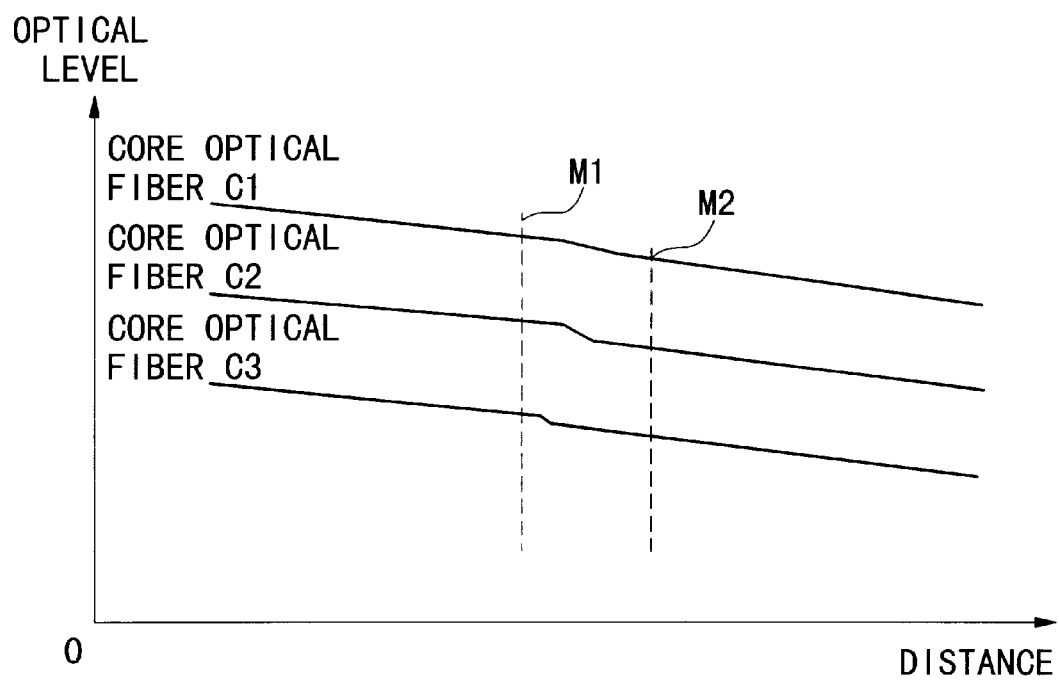
FIG. 9 is an explanatory diagram showing an example of a measured waveform for the case where a core optical fiber C3 exists which incorporates an event which is not detected.

In FIG. 5 the first four core optical fibers to be measured from the plurality of core optical fibers are labeled C~C4. In the figure, the labels SP1~SP4 and the labels EP1~EP4 refer to the start points and end points of the measured waveforms of the core optical fibers C1~C4 respectively. Furthermore, the labels E11~E13, E21~E23, E31~E32 and E41~E43 refer to event points in the waveforms of the core optical fibers C1~C4 respectively.

First, the CPU 11 detects the event points based on the waveform data of core optical fiber C1 using the method outlined below. The CPU 11 analyzes the waveform data in sequence starting from the start point SP1 and identifies all the level differences (fusion points and reflection points). Next, the CPU 11 assigns "provisional" markers Ma~Md to the first level difference identified, in the same manner as that described in FIG. 4, and computes the connection loss value due to the first level difference, and then determines whether or not the level difference constitutes an event point. For example, the connection loss for the event Eb shown in FIG. 4 would be computed as follows. If the distance is termed (x) then the portion of the measured waveform between the markers Ma and Mb can be expressed as an approximate straight line of formula f1(x)=a1×x+b1, and similarly the portion of the measured waveform between the markers Mc and Md can be expressed as an approximate straight line of formula f2(x)=a2×x+b2. The coefficients a1, a2, b1 and b2 in these formula can be easily determined from the optical levels La~Ld at the respective distances xa~xd and markers Ma~Md. The connection loss occurring at event Eb is then computed from the following formula.

$$\text{Connection loss [dB]} = (a1-a2) \times 2 - (b1-b2) \quad (1)$$

If the value of the computed connection loss equals or exceeds a preset threshold value (for example 0.2[dB]), then an event point is judged to exist at the first level difference of the core optical fiber C1. For example, if the event E11 of the core optical fiber C1 is judged to have met the conditions, then the CPU 11 determines the event E11 to be an event point. The processing for distinguishing event points where the event point is not a fusion point, but rather is an observation of reflected light as in label R of FIG. 3, is virtually identical. That is, in the case of reflected light, the only difference from a fusion point is that the connection classification contains information which indicates a reflection point instead of a fusion point. On the other hand, in the case where the connection loss of the level difference portion is less than 0.2[dB], the CPU 11 will ignore the level difference and fail to assign an event point.

Next, the CPU 11 determines whether or not the second and subsequent level differences of the core optical fiber C1 constitute event points, using the same process as that outlined for the first level difference. In this manner, the CPU 11 detects the events E11~E13 and the end point EP1 shown in FIG. 5.

Once all of the event points relating to the core optical fiber C1 have been determined, the CPU 11 sets final marker locations for each event point. That is, for event E11 the marker Ma is set at the start point SP1, the marker Mb at the vertex of the level difference, and the marker Mc at a distance equivalent to a pulse width beyond the marker Mb. The setting of the marker Md of the event point E11 is described below. Furthermore, for the event E12 the marker Ma is set at the same location as that of the marker Mc of the event E11, and the markers Mb and Mc are set in the same manner as that described for the event E11. At this time, the marker Md of the event E11 is set at the same location as the marker Mb of the event E12. Then the setting of the markers for the event E13 is conducted in the same manner. That is, the marker Ma is set at the same location as that of the marker Mc of the event E12, and the markers Mb and Mc are set in the same manner as that described for the event E12. At this time, the marker Md of the event E12 is set at the same location as the marker Mb of the event E13. The marker Md of the event E13 can then be set, for example at the corner point of the rising portion at the end point EP1. Only the markers Ma and Mb are set for the end point EP1.

Once the marker locations have been set for each of the event points, the CPU 11 records the connection classification and the distances (locations) of the respective markers Ma~Mb set for the event points E11~E13 and the end point EP1 in the RAM 13 as final event information (hereafter referred to as "master event information"). The CPU 11 then detects the event points for the core optical fibers C2, C3, C4 . . . in the same manner, and records into the RAM 13 the event information relating to the one or more detected event points and end points (step S2).

Next, the CPU 11 registers each of the event points and the end point detected for the head core optical fiber C1 into the master file in the RAM 13. The master file held in the RAM 13 may eventually be transferred to the HDD 16 or to a floppy disk mounted in the FDD 17.

As described below, the CPU 11 then compares the event points registered in the master file with the event points for each of the respective core optical fibers, and determines whether or not the two event points are identical. The CPU 11 initializes the core optical fiber C2 as the first object core optical fiber for which the event information is to be compared with the event information registered in the master file (step S3).

Next, the CPU 11 sequentially computes, based on the distance of each event point registered in the master file (that is, the distance xb corresponding to the marker Mb assigned to each of the event points), the difference in event distances between adjacent event points (hereafter this difference is referred to as the "interval distance"). Hence, the difference in distances between the start point SP1 and the event E11 is termed the E11 interval distance. Similarly, the difference in distances between the events E11 and E12 is termed the E12 interval distance, with the other interval distances being computed in the same manner, and with the difference in distances between the event E13 and the end point EP1 being termed the EP1 interval distance. The CPU 11 then stores in the RAM 13 the computed interval distance relating to each event point (step S4).

Next, the CPU 11 compares the event information of the event points registered in the master file with the event information relating to the event points detected for the core optical fiber C2, and determines whether or not any of the event points of the core optical fiber C2 are the same as the event points stored in the master file. That is, firstly the CPU 11 takes the interval distance computed for the event point E11, being the first event point in the master file, and based on this interval distance determines an allowable range specified in terms of a preset deviation setting value. For this explanation if we assume that the deviation setting value has been set at 5%, then the CPU 11 defines the allowable range as 5% of the interval distance of the event E11. The CPU 11 then determines whether or not any of the event distances corresponding to the events E21~E23 detected for the core optical fiber C2, fall within the allowable range (±5%) centered on the event distance of the event E11. If an event point which satisfies the conditions is found, then that event point is judged to be identical to the event E11 of the master file.

For example, if the event distance of the event E11 is 3[km] and the interval distance computed for the event E11 is 2[km], then the allowable range is 5% of this interval distance, 100[m]. Therefore, should the event distance of the event E22 present in the core optical fiber C2 fall within the allowable range (±100[m]) centered on the event distance of the event E11 (that is, within the range 2.9[km]~3.1[km]) then the events E11 and E22 are judged to be the same event (step S5).

By using the above procedure to set an allowable range which is centered on the event point distance, and which is a distance range defined as the interval distance of the event point multiplied by a predetermined deviation value, the determination of identical event points can be conducted. Consequently, judgements can be made as to whether or not two event points are identical based on an allowable range corresponding to the lengths of the respective optical fibers which connect the adjacent event points.

In the case where an event point is detected from among the event points of the core optical fiber C2 which is identical with the event E11 of the master file, then of the two, the event point which has the shorter event distance is designated as the master event, and the event distance of this master event then registered in the master file. Thus in this case the event E22 is judged to be identical to the event E11, but only in the case where the event distance of the event E22 is shorter than the event distance of the event E11 is the event information content of the master file updated with the event information of event E22.

In this manner, for each group of identical event points, the event information relating to the event point with the shortest event distance is stored in the master file. In so doing, the possibility disappears of an event point distance which falls within the allowable distance range being closer to the near end of the optical fiber than the distance defined in the master event information. Consequently, even in those cases where the event point distances vary across each core optical fiber, the optical fiber characteristic data, namely the connection loss value and the amount of reflection, can be classified for all the event points of all the core optical fibers, without exception.

Next the CPU 11 performs the same processing as that executed on the event E11 on each of the events E12, E13 and the end point EP1 registered in the master file. However, of the events E21~E23 and the end point EP2 present in the core optical fiber C2, not a single event distance falls within the range equivalent to ±5% of the interval distance centered on the event distance of the event E12. In this type of case where there are no identical event points among the event points of the core optical fiber C2, the CPU 11 performs no processing on the event E12 and proceeds to the processing of the next event E13. In the case of this event E13, as before, of the events E21~E23 and the end point EP2, not a single event distance falls within the range equivalent to ±5% of the interval distance centered on the event distance of the event E13. Consequently, the CPU 11 performs on the end points EP1 and EP2 the same length judgement of the event distances as that performed on the event E11, and updates the event information of the master file in accordance with the judgement results (step S6).

Following completion of the processing of all the event points and end points registered in the master file, the CPU 11 searches all the event points and the end point of the core optical fiber C2 for all the event points which do not coincide with any of the event points registered in the master file. In this case, events E21 and E23 are found, and so the CPU 11 judges both of these events to be new events, and registers the event information relating to the two event points in the master file (step S7). As a result of the processing described above, the six master events E21, E11 (E22), E12, E23, E13 and EP1(EP2) are registered in the master file. As described above, in the case of events E11 and E22 for example, only the smaller event distance of the two is registered.

The CPU 11 then sequentially alters the object core optical fiber to process the core optical fibers C3, C4, . . . (step S8) and continues to execute on each object core optical fiber the same processing as that described for the core optical fiber C2 until the result of the judgement obtained at step S9 is "No". That is, when the core optical fiber C3 is being processed, the CPU 11 first computes the interval distance for each of the six event points registered in the master file. Next, the CPU 11 recognizes that the first event registered in the master file is the event E21, and then searches for event points which have event distances which fall within the range equivalent to ±5% of the interval distance centered on the event distance of the event E21, which yields event E31 as a result. The CPU 11 then analyzes the events E21 and E31 and uses the event information for the event which has the smaller event distance to update the event information registered in the master file. In the same manner, the CPU 11 determines that the events E32 and E12 are identical, and also that the end points EP1 and EP3 are identical. As can be appreciated from the above explanation, no new event points associated with the core optical fiber C3 are added to the master file. The exact same processing is then performed on the core optical fiber C4 and the determination made that events E41 and E11, events E42 and E12, events E43 and E13, and the end points EP4 and EP1 are respectively identical. As a result, from each pair of events judged to be identical, the event information relating to the event for which the event distance is shorter is used to update the event information of the master file.

All the subsequent core optical fibers after the core optical fiber C4 are then processed in the same manner. The master file at the time processing of the final core optical fiber is completed is then deemed the final master file. Once the final master file has been obtained, the CPU 11 creates classification tables like those shown in FIG. 6 which are then output to the output device 15. For example, the classification tables may be displayed on a screen. In the tables shown in FIG. 6, for simplicity of explanation, results are shown for only eight core optical fibers for the case where six connection points exist as event points in the core optical fibers.

In order to create the classification tables shown in FIG. 6, the CPU 11 must compute the connection loss for each event point on each core optical fiber. That is, the CPU 11 refers to the measured waveform data stored on the HDD 16 which relates to the core optical fiber C1 and which falls within the range between the markers Mb and Mc assigned to each event point registered in the master file, and following the procedure outlined above, detects any level differences which exist within the specified ranges and then computes the connection loss (amount of change) at the level difference portion in accordance with formula (1). Furthermore, in those cases where the connection classification of the event point is defined as a reflection point, the CPU 11 computes the difference in optical level between the peak and the base of the reflection point as shown in FIG. 3, and assigns this optical level difference (amount of change) as the amount of reflection. However, for the distance corresponding to the event point E21 (see FIG. 5) which exists in the core optical fiber C2, no level difference or reflection point exists for the core optical fiber C1, and so in this type of case the connection loss and the amount of reflection are both regarded as having returned a zero calculation. Moreover, in the example shown in FIG. 6 because all of the connection classifications are set as "fusion", only the connection loss is shown, and no values are listed for the amounts of reflection. However, if the operator inputs a command from the input device 14 requesting the display of the amount of reflection values also, then for those connection points for which the connection classification is set as a reflection point, both a connection loss and an amount of reflection will be displayed on a screen or the like of the output device 15.

The connection classification shown in FIG. 6 shows whether the event occurring at each connection point is a "fusion" point like those shown, or a "reflection" point. Moreover, the "distance" value listed in the table is the interval distance computed for each connection point, which is generated by the CPU 11 by calculating the difference in distances (units of [km]) between adjacent events registered in the master file (recorded in the table as "connection point 1"~"connection point 6", and "end") (step 10).

In the above explanation the deviation setting was assumed to be a fixed value (±5%), but of course the present invention is not limited to this case. That is, a method wherein the operator inputs the deviation setting via the input device 14 before initiating the classification processing via the measured data classification apparatus 5 is also acceptable. The CPU 11 then stores the input deviation settings either in the RAM 13 or on the HDD 16, and each time a determination is required as to whether two event points are identical, an allowable range is determined based on the stored deviation settings and centered on the event distance of the event point registered in the master file.

Furthermore in the explanation above, each time a classification table is created the connection loss for every event point is recomputed. However, as mentioned above, the connection loss value is determined during the process of determining whether or not a detected level difference is an event point, and so an acceptable alternative method might involve the connection loss values computed during this process being saved on the HDD 16, and then when a classification table is produced, the event point connection loss values which are stored on the HDD 16 can be used, with only the connection loss values for those level differences which were not recognized as event points needing to be computed. Moreover, in the case where the connection classification of an event point is set as a reflection point, the amount of reflection can also be stored on the HDD 16 in the same manner as the connection loss value, and then used during the creation of classification tables.

What is claimed is:

1. An apparatus for classification of measured data from a multi-core optical fiber comprising:

event information generating means which extracts all event points from measured waveform data for each core optical fiber obtained by conducting an optical pulse test on a multi-core optical fiber, and generates for each of said event points, event information which includes distance data for a path of said optical fiber, master event determining means for searching for all groups of identical event points from amongst said all of the event points, and determining the event information related to one of the event points of said identical event points for each of said searched for groups as master event information, and classifying means for computing for each of said core optical fibers, based on said master event information and said measured waveform data, characteristic data of said optical fiber relating to each event point which corresponds to said master event information.

2. An apparatus for classification of measured data from a multi-core optical fiber according to claim 1, wherein of each of said identical event points included in said group, said master event determining means determines the event information having the shortest distance data as said distance data, as said master event information.

3. An apparatus for classification of measured data from a multi-core optical fiber according to claim 1, wherein when a difference between a distance of an event point on one core optical fiber and a distance of an event point on a core optical fiber which is different from said one core optical fiber, is accommodated within a predetermined allowable range, said master event determining means judges that these two event points are mutually identical event points.

4. An apparatus for classification of measured data from a multi-core optical fiber according to claim 3, wherein said master event determining means computes for each said event point a difference in distances between adjacent said event points as an interval distance, and with each distance of said event point as the center, determines for said interval distance computed for said event point, that within a range of the distance multiplied by a predetermined deviation value is said allowable range.

5. An apparatus for classification of measured data from a multi-core optical fiber according to claim 1, wherein in said event information there is further included a plurality of markers allocated to event points corresponding to said event information, and connection classification for said event points.

6. An apparatus for classification of measured data from a multi-core optical fiber according to claim 5, wherein said plurality of markers include; a first marker set at a location indicated by said distance data which corresponds to said event point, a second marker set at a location towards a far end side from said location and away by a pulse width of an optical pulse input to said optical fiber, a third marker set at a position of an event point on a far end side adjacent to said event point, and a fourth marker set at the same position as said second marker in relation to an event point on a near end side adjacent to said event point.

7. An apparatus for classification of measured data from a multi-core optical fiber according to claim 1, wherein of the level differences existing in the measured waveform shown by said measured waveform data, said event information generating means determines only level differences where the amount of change in optical level in said level differences is above a predetermined threshold value as said event point, and extracts said event information related to said event point.

8. An apparatus for classification of measured data from a multi-core optical fiber according to claim 7, further having storage means for storing said amount of change in optical level, and said event information generating means stores said amount of change in optical level in said storage means, and said classifying means classifies said characteristic data of said optical fiber using said amount of change in optical level stored in said storage means, and computes said amount of change in optical level in relation to an event point which is not stored in said storage means.

9. An apparatus for classification of measured data from a multi-core optical fiber according to claim 1, wherein in said characteristic data there is included connection losses and amounts of reflection for each of said event points.

10. A method for classification of measured data from a multi-core optical fiber said method involving:

detecting all event points from measured waveform data for each core optical fiber obtained by conducting an optical pulse test on a multi-core optical fiber, generating for each of said event points, event information which includes distance data for a path of said optical fiber, searching for all groups of identical event points from amongst said all of the event points, determining the event information related to one of the event points of said identical event points for each of said searched for groups as master event information, and computing for each of said core optical fibers, based on said master event information and said measured waveform data, characteristic data of said optical fiber relating to each event point which corresponds to said master event information.

11. A method for classification of measured data from a multi-core optical fiber according to claim 10, wherein of each of said identical event points included in said group, the event information having the shortest distance data as said distance data is determined as said master event information.

12. A method for classification of measured data from a multi-core optical fiber according to claim 10, wherein when a difference between a distance of an event point on one core optical fiber and a distance of an event point on a core optical fiber which is different from said one core optical fiber, is accommodated within a predetermined allowable range, it is judged that these two event points are mutually identical event points.

13. A method for classification of measured data from a multi-core optical fiber according to claim 12, wherein in the case of searching for said identical event points, a difference in distances between adjacent said event points is computed for each said event point as an interval distance, and with each distance of said event point as the center, it is determined for said interval distance computed for said event point, that within a range of the distance multiplied by a predetermined deviation value is said allowable range.

14. A method for classification of measured data from a multi-core optical fiber said method having:

a step for detecting all event points from measured waveform data for each core optical fiber obtained by conducting an optical pulse test on a multi-core optical fiber, a step for generating for all of said event points, event information which includes distance data for a path of said optical fiber, a step for storing in a master file said event information of one of said core optical fibers selected from said core optical fibers as a head core optical fiber, a step for selecting a core optical fiber other than said head core optical fiber as an object core optical fiber, a searching step for judging event points which occur within an allowable range, based on event point distances corresponding to each event information stored in the master file, to be mutually identical event points, and searching out the event information relating to the event points judged to be identical from the event information of said object core optical fiber, step for determining one event information from the event information judged to be identical as master event information, and replacing the event information within the master file with this master event information, a registration step for registering in said master file all of the event information from the event information relating to said object core optical fiber which is not the same as the event information stored in said master file, a step for sequentially changing the object core optical fiber and repeating each step from said searching step to said registration step for all of the core optical fibers other than said head core optical fiber, and a step for computing for each said core optical fiber based on said event information and said measured waveform data stored in said master file, characteristic data of the optical fiber for each event point corresponding to the stored event information in said master file.

15. A computer program product having a computer usable recording medium on which a classification processing program which can be read by a computer is recorded, said program having:

a step for detecting all event points from measured waveform data for each core optical fiber obtained by conducting an optical pulse test on a multi-core optical fiber, a step for generating for each of said event points, event information which includes distance data for a path of said optical fiber, a step for searching for all groups of identical event points from amongst said all of the event points, a step for determining the event information related to one of the event points of said identical event points for each of said searched for groups as master event information, and a step for computing for each of said core optical fibers, based on said master event information and said measured waveform data, characteristic data of said optical fiber relating to each event point which corresponds to said master event information.

16. A computer program product according to claim 15, wherein of each of the identical event points included in said group, the event information having shortest distance data as said distance data is determined as said master event information.

17. A computer program product according to claim 15, wherein when a difference between a distance of an event point on one core optical fiber and a distance of an event point on a core optical fiber which is different from said one core optical fiber, is accommodated within a predetermined allowable range, it is judged that these two event points are mutually identical event points.

18. A computer program product according to claim 17, wherein in a case of searching for said identical event points, a difference in distances between adjacent said event points is computed for each said event point as an interval distance, and with each distance of said event point as the center, it is determined for said interval distance computed for said event point, that within a range of the distance multiplied by a predetermined deviation value is said allowable range.

19. A computer program product having a computer usable recording medium on which a classification processing program which can be read by a computer is recorded, said program having:

a step for detecting all event points from measured waveform data for each core optical fiber obtained by conducting an optical pulse test on a multi-core optical fiber, a step for generating for all of said event points, event information which includes distance data for a path of said optical fiber, a step for storing in a master file said event information of one of said core optical fibers selected from said core optical fibers as a head core optical fiber, a step for selecting a core optical fiber other than said head core optical fiber as an object core optical fiber, a searching step for judging event points which occur within an allowable range, based on event point distances corresponding to each event information stored in the master file, to be mutually identical event points, and searching out the event information relating to the event points judged to be identical from the event information of said object core optical fiber, a step for determining one event information from the event information judged to be identical as master event information, and replacing the event information within the master file with this master event information, a registration step for registering in said master file all of the event information from the event information relating to said object core optical fiber which is not the same as the event information stored in said master file, a step for sequentially changing the object core optical fiber and repeating each step from said searching step to said registration step for all of the core optical fibers other than said head core optical fiber, and a step for computing for each said core optical fiber based on said event information and said measured waveform data stored in said master file, characteristic data of the optical fiber for each event point corresponding to the stored event information in said master file.

* * * * *